(12) United States Patent
Green et al.

(10) Patent No.: US 7,226,078 B2
(45) Date of Patent: Jun. 5, 2007

(54) INFLATOR PROJECTILE

(75) Inventors: David J. Green, Brigham City, UT (US); C. Paul Dinsdale, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 357 days.

(21) Appl. No.: 10/927,698

(22) Filed: Aug. 27, 2004

(65) Prior Publication Data

US 2006/0043715 A1 Mar. 2, 2006

(51) Int. Cl.
B60R 21/26 (2006.01)

(52) U.S. Cl. .................. 280/737; 102/531; 137/68.25; 137/68.19

(58) Field of Classification Search ................ 280/737, 280/736, 741; 102/530, 531; 137/68.19, 137/68.21–68.28
See application file for complete search history.

(56) References Cited

U.S. PATENT DOCUMENTS

| 5,226,561 | A | 7/1993 | Hamilton et al. | |
|---|---|---|---|---|
| 5,263,740 | A | 11/1993 | Frey et al. | |
| 5,668,345 | A * | 9/1997 | Schroeder et al. | 102/289 |
| 6,010,153 | A * | 1/2000 | Halas et al. | 280/737 |
| 6,244,622 | B1 * | 6/2001 | Al-Amin et al. | 280/737 |
| 6,295,935 | B1 * | 10/2001 | Swann et al. | 102/530 |
| 6,338,500 | B1 | 1/2002 | Perotto | |
| 7,044,501 | B2 * | 5/2006 | Yamazaki | 280/737 |
| 2003/0155755 | A1 * | 8/2003 | Iwai et al. | 280/737 |
| 2005/0146121 | A1 * | 7/2005 | Campbell et al. | 280/737 |

* cited by examiner

Primary Examiner—Ruth Ilan
(74) Attorney, Agent, or Firm—Sally J Brown; Stoel Rives LLP

(57) ABSTRACT

Systems, methods, and apparatus for use in an airbag inflation system are disclosed. An explosively formable projectile piece is positioned adjacent to an opening and, upon deployment of an initiator, is forced through the opening, thereby changing the shape of the projectile piece. The projectile piece is projected towards a rupturable wall. Once the projectile piece has ruptured the wall, the airbag inflation gas can pass through the opening in the wall and inflate the airbag.

32 Claims, 4 Drawing Sheets

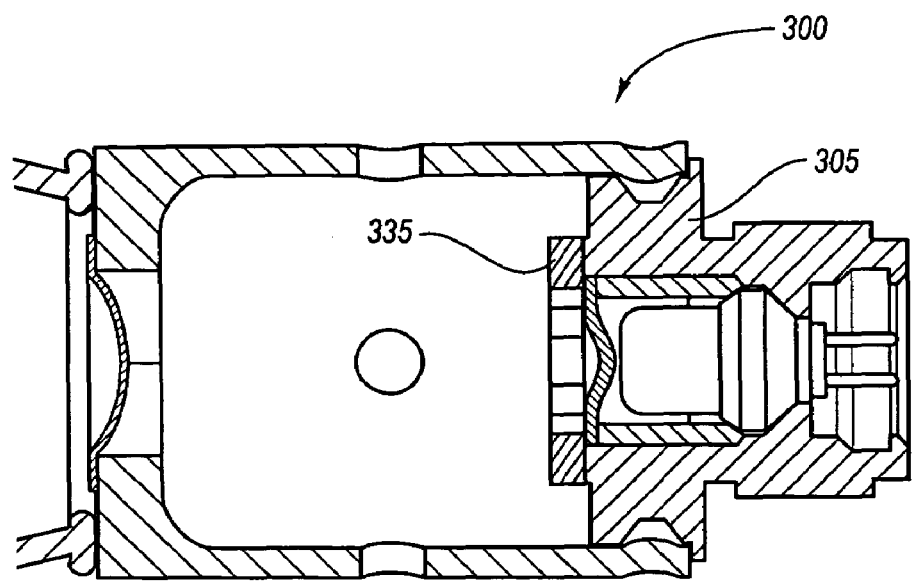
Fig. 6
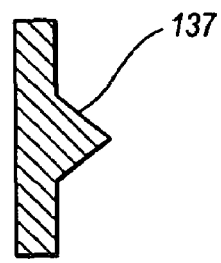  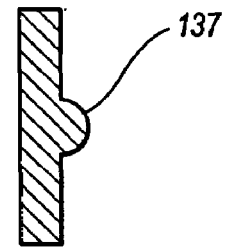
Fig. 7A   Fig. 7B   Fig. 7C
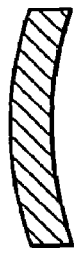 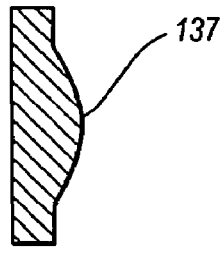
Fig. 7D   Fig. 7E

INFLATOR PROJECTILE

TECHNICAL FIELD

The present invention relates generally to the field of automotive protection systems. More specifically, the present invention relates to systems for inflation of airbags.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 6 is a cross-sectional view of still another embodiment of an airbag inflation system.

FIGS. 7A–7E are cross-sectional views of several embodiments of explosively formable projectile pieces.

DETAILED DESCRIPTION OF PREFERRED EMBODIMENTS

Described below are embodiments of an inflator projectile system used to puncture or otherwise open a burst disk or other rupturable wall of an airbag inflation system. The system uses an initiator, which is stored in a housing. The initiator, once deployed, forces an explosively formable projectile piece through an opening in the housing. As the projectile piece is forced through the opening, its shape is changed. The projectile piece is then typically shot through a rupturable wall, such as a burst disk, which had formerly obstructed a second opening. Once the rupturable wall has been ruptured, fluid communication may take place through the second opening in order to, for instance, allow for inflation of an airbag.

Figure 1:
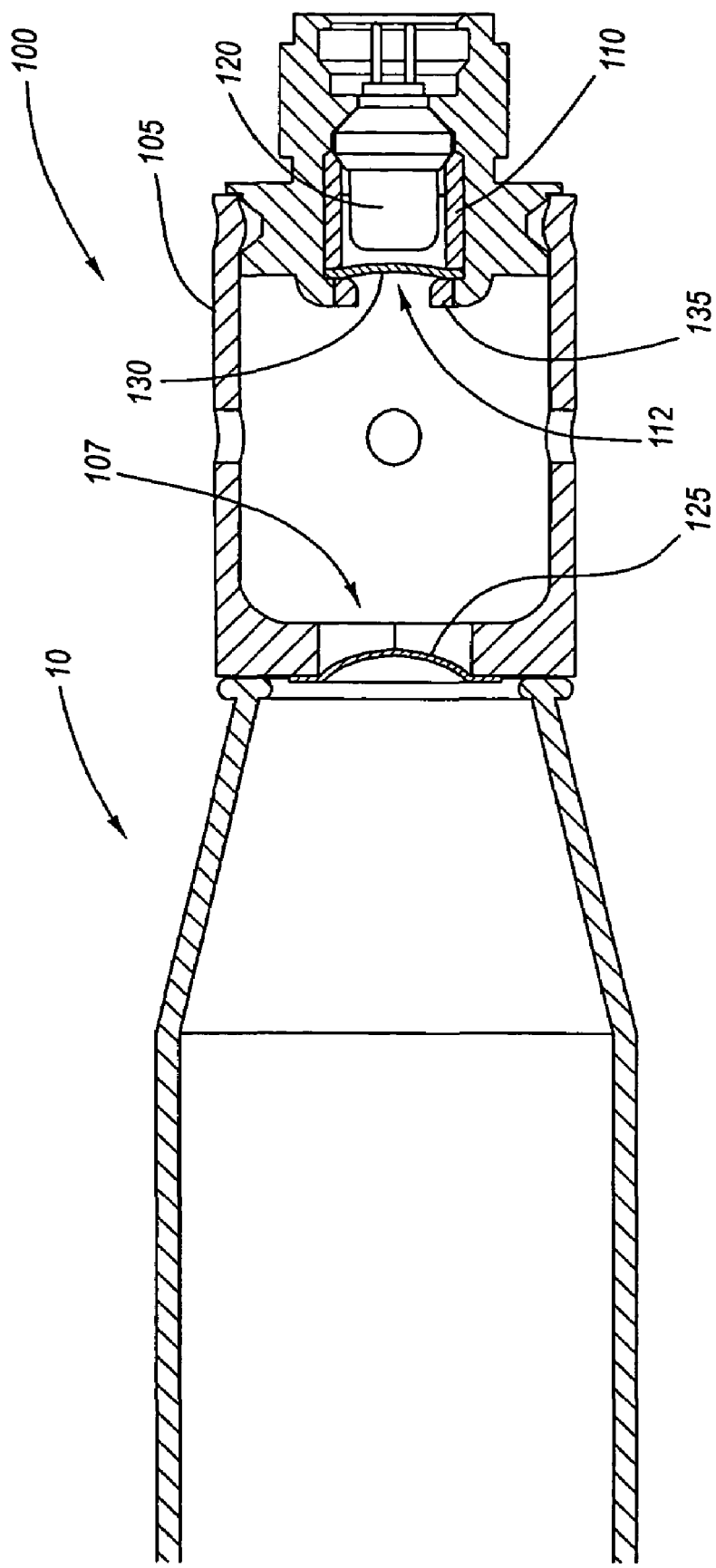
FIG. 1 is a cross-sectional view of one embodiment of an airbag inflation system.

With reference now to the embodiment depicted in FIG. 1, an airbag 10 connected with an airbag inflation system 100 is shown. The airbag inflation system 100 includes a main housing 105, an initiator housing 110, a first opening 107, a second opening 112, and an initiator 120. Initiator 120 in the depicted embodiment comprises a squib. It should be understood that, although the embodiment depicted in FIG. 1 comprises two housings, a single housing may be used. Alternatively, any number of housings greater than two may be used, each of which is connected with at least one other housing. Likewise, the first and second openings may be in the same housing or, alternatively, they may be in different housings connected with one another.

First opening 107 is obstructed with a rupturable wall 125. Rupturable wall 125 in FIG. 1 comprises a burst disk. Once burst disk 125 has been ruptured, fluid communication may take place through the first opening 107 and into the airbag 10.

An explosively formable projectile piece 130 is positioned adjacent to a second opening 112. Explosively formable projectile piece 130 may be formed to a wide variety of shapes and sizes, including the disk-shaped embodiment shown in FIG. 1. Projectile piece 130 may also be concave-shaped, or shaped somewhat like a contact lens, as also shown in FIG. 1. Of course, whereas the embodiment shown in FIG. 1 shows the concave side of piece 130 facing away from the initiator 120, the concave side may instead face initiator 120 if desired.

It may also be preferable in some embodiments to provide an explosively formable projectile piece that is thicker or otherwise has more mass towards its center than along its perimeter. In such embodiments, there may be a gradual increase in thickness from the perimeter to the center or there may be a pointed tip, rounded dome, or other bulge at or near the center of the projectile piece. Embodiments of explosively formable projectile pieces including such features will be discussed later with reference to FIGS. 7A–7E. Configurations having increased mass or thickness at the center may facilitate desirable shaping and flight patterns. It is intended that the term "disk shaped" be construed to encompass the "contact lens" or concave projectile piece embodiment and also some embodiments having increased thickness or otherwise increased mass towards their center.

Piece 130 may also be comprised of a variety of different materials, such as armco iron, tantalum, brass, low carbon steel, high strength low-alloy steel, copper, stainless steel, aluminum, nickel-based superalloys, or precipitation hardening stainless steel. In addition to the materials listed, any metallic material with the ductility to deform into a desirable projectile shape and the strength to withstand an explosive blast without fragmenting would be suitable for use as an explosively formable projectile piece.

Projectile piece 130 may also be formed using a wide variety of formation processes, such as stamping or impact forming processes. Moreover, it could be built into the squib or other initiator or could be installed at the time the initiator is installed into the inflator system. One embodiment of an explosively formable projectile piece used in testing the invention was a disk ⅜ inch in diameter, about 0.035 inches thick, and had a mass of approximately 500 mg. Obviously, this is but one example of a limitless number of shapes, sizes, and masses that may be suitable for use as an explosively formable projectile piece.

Figure 2A:
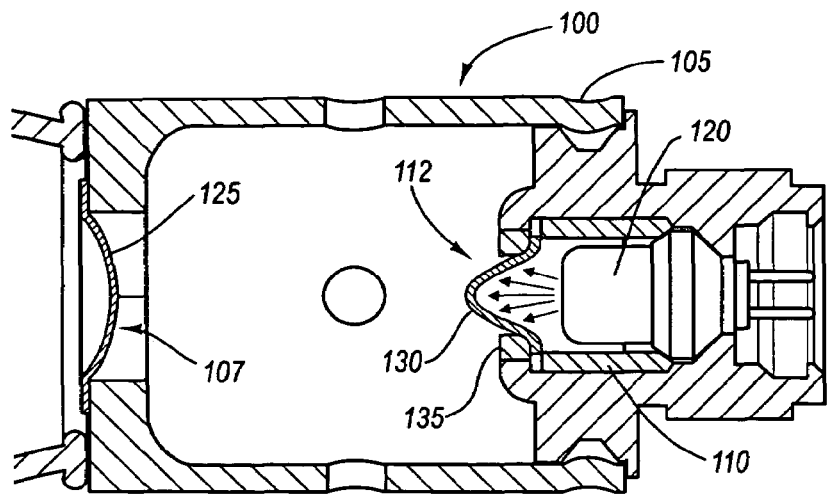
FIG. 2A is a cross-sectional view of an airbag inflation system at a point in time immediately following deployment.

The embodiment shown in FIG. 1 also has a shaping ring 135. The shaping ring 135 may be a separate piece which is attached to one or both of the housings or, alternatively, it may be integrally formed with a housing. As best seen in FIG. 1 and FIG. 2A, shaping ring 135 defines the diameter of the second opening 112, which is smaller than the diameter of the projectile piece 130 before it is projected. In this manner, as the projectile piece is forced through the second opening by the initiator, the shape of the projectile piece is changed.

Figure 2B:
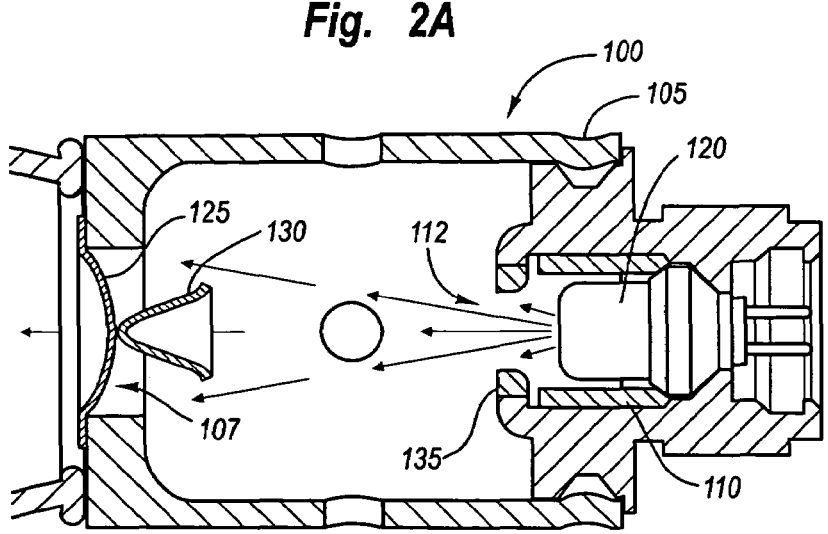
FIG. 2B is a cross-sectional view of the airbag inflation system of FIG. 2A showing the explosively formable projectile piece being projected towards a rupturable wall.
Figure 2C:
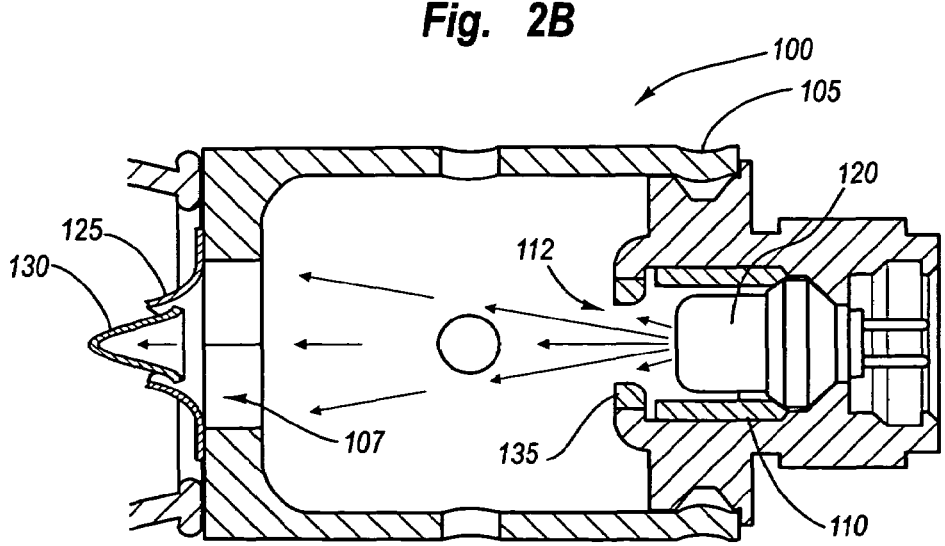
FIG. 2C is a cross-sectional view of the airbag inflation system of FIG. 2B showing the projectile piece immediately after it ruptures the rupturable wall.

With reference now to FIGS. 2A–2C, the deployment of the initiator and associated firing of the explosively formable projectile piece through the rupturable wall will now be discussed further. In FIG. 2A, airbag inflation system 100 is shown immediately after deployment of the initiator 120. As can be seen in FIG. 2A, explosively formable projectile piece 130 is being forced through opening 112. More specifically, explosively formable projectile piece 130 is being forced through shaping ring 135. As projectile piece 130 is forced through shaping ring 135, its shape is changed from the disk shape shown in FIG. 1 to more of an elongated dome shape, as shown in FIGS. 2A–2C.

Once projectile piece 130 has exited the opening defined by shaping ring 135, it is then projected towards rupturable wall 125, as depicted in FIG. 2B. Explosively formable projectile piece 130 then penetrates rupturable wall 125, as shown in FIG. 2C, thereby permitting fluid communication to take place through opening 107 in order to allow airbag 10 to inflate.

Figure 3:
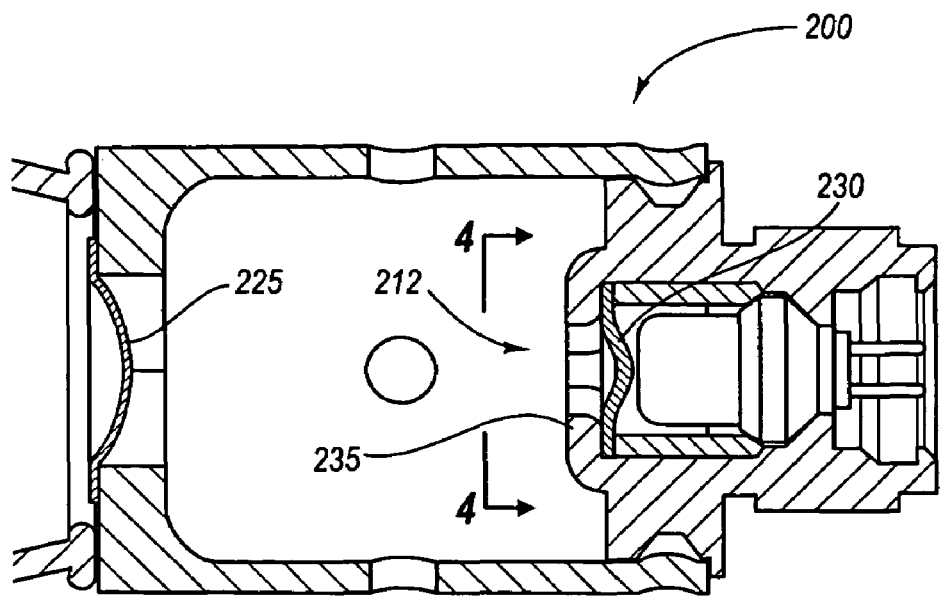
FIG. 3 is a cross-sectional view of another embodiment of an airbag inflation system having a slotted opening.
Figure 4:
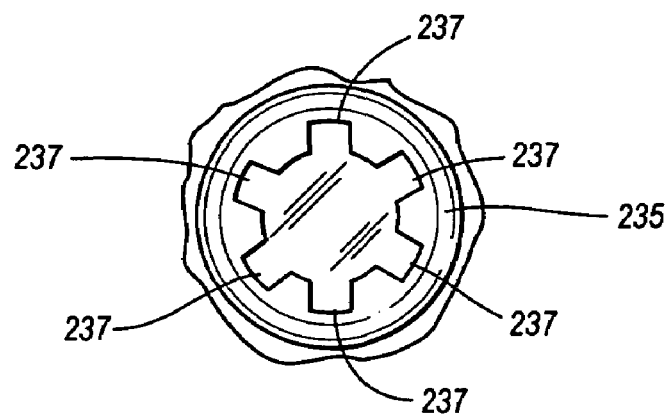
FIG. 4 is a cross-sectional view taken along line 4—4 in FIG. 3 showing the slotted opening.

It may be preferable under certain circumstances to create an opening in the rupturable wall with a greater area to allow for more rapid expansion of the airbag. Under such circumstances, an alternative embodiment such as the embodiment depicted in FIG. 3 may be used. FIG. 3 is similar to the embodiments previously discussed, with one exception. Opening 212 in airbag inflation system 200 is a slotted opening. In other words, opening 212, which is defined by shaping ring 235, is formed with a series of slots, as best seen in FIG. 4 at 237. Although the embodiment shown in FIGS. 3–4 includes a shaping ring 235 having six slots 237, any number of slots may be used as desired. Even a single slot may be used, although a shaping ring with a single slot may not facilitate the creation of an opening in a rupturable wall that is as large as a shaping ring with multiple slots.

Figure 5:
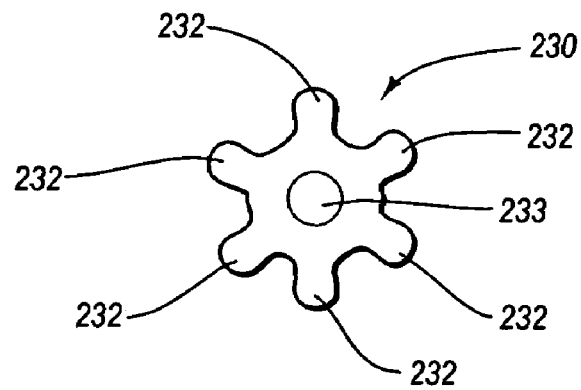
FIG. 5 is an end view showing an explosively formable projectile piece following projection through a slotted opening.

After an explosively formable projectile piece is projected through a slotted opening, such as shaping ring 235 with slots 237, it will have one or more projections at its perimeter corresponding with the number of slots in the shaping ring. FIG. 5 is an end view depicting an explosively formable projectile piece 230 following projection through a slotted opening. As can be seen from FIG. 5, projectile piece 230 has six projections 232 corresponding with the six slots 237 in shaping ring 235. A domed tip 233 at the center of projectile piece 230 is also shown in FIG. 5. As formerly disk-shaped projectile piece 230 is forced through a slotted opening, each of the slots 237 in the slotted opening forms a projection 232 at the perimeter of the projectile piece. Projections 232 facilitate the creation of tears or petals in burst disk 235, such that a larger opening is created in the burst disk than would otherwise have been created by a projectile piece having a circular perimeter without projections extending therefrom.

Another embodiment of an airbag inflation system is depicted in FIG. 6 at 300. This embodiment is similar to the airbag inflation system 200 shown in FIG. 3, with one exception. Airbag inflation system 300 includes a slotted opening defined by a shaping ring 335 that is attached to housing 305, rather than integral with the housing as in airbag inflation system 200 of FIG. 3.

FIGS. 7A–7E depict various explosively formable projectile piece embodiments. Each of the embodiments depicted in these figures are disk shaped. In addition, each of the embodiments depicted in FIGS. 7A, 7C, and 7E are examples of explosively formable projectile pieces having more mass towards their center than along their perimeter.

The embodiment shown in FIG. 7A includes a pointed or cone-shaped central portion 137. The embodiment of FIG. 7C has a rounded or dome-shaped central portion 137. The embodiment of FIG. 7E also has a dome-shaped central portion 137, but the central portion of the embodiment of FIG. 7E has a more gradual increase in thickness from its perimeter to its center.

It should be understood that the principles of certain embodiments of the invention allow for firing a formed metal projectile typically much larger than a "jet" from a shape charge. Moreover, certain embodiments of the invention allow for mechanical forming of the projectile without the use of high explosives, which results in a process that is typically much safer and more controlled for use in automotive inflation systems.

It will be obvious to those having skill in the art that many changes may be made to the details of the above-described embodiments without departing from the underlying principles of the invention. The scope of the present invention should, therefore, be determined only by the following claims.

The Invention claimed is:

1. An apparatus for use in an airbag inflation system, comprising:
   a housing at least partially defining a chamber, wherein the housing has an opening:
   an initiator positioned within the chamber; and
   an explosively formable projectile piece positioned adjacent to the opening with at least the periphery of the projectile piece positioned inside of the opening relative to the initiator, wherein the diameter of the opening is smaller than the diameter of the projectile piece such that, upon deployment of the initiator, the projectile piece is forced through the opening, thereby changing the shape of the projectile piece.

2. The apparatus of claim 1, further comprising a rupturable wall positioned opposite from the projectile piece such that the projectile piece ruptures the wall upon deployment of the initiator.

3. The apparatus of claim 2, wherein the rupturable wall is a burst disk.

4. The apparatus of claim 2, further comprising a second housing, and wherein the rupturable wall obstructs an opening in the second housing.

5. The apparatus of claim 1, wherein the initiator is a squib.

6. The apparatus of claim 1, wherein the opening is slotted.

7. The apparatus of claim 1, wherein the opening is defined by a shaping ring connected to the housing.

8. The apparatus of claim 7, wherein the shaping ring is slotted.

9. The apparatus of claim 1, wherein the explosively formable projectile piece has more mass towards its center than along it perimeter.

10. The apparatus of claim 1, wherein the explosively formable projectile piece is disk shaped.

11. The apparatus of claim 10, wherein the explosively formable projectile piece has a concave shape.

12. An apparatus for use in an airbag inflation system, comprising:
    a housing at least partially defining a chamber, wherein the housing has an opening;
    an initiator positioned within the chamber; and
    a disk shaped explosively formable projectile piece positioned adjacent to the opening with at least the periphery of the projectile piece positioned inside of the opening relative to the initiator such that, upon deployment of the initiator, the projectile piece is forced through the opening, and wherein the opening is configured such that the shape of the projectile piece is changed as the projectile piece is forced through the opening.

13. The apparatus of claim 12, further comprising a rupturable wall positioned opposite from the projectile piece such that the projectile piece ruptures The wall upon deployment of The initiator.

14. The apparatus of claim 13, wherein the rupturable wall is a burst disk.

15. The apparatus of claim 13, further comprising a second housing, and wherein the rupturable wall obstructs an opening in the second housing.

16. The apparatus of claim 12, wherein the initiator is a squib.

17. The apparatus of claim 12, wherein the opening is slotted.

18. The apparatus of claim 12, wherein the opening is defined by a shaping ring connected to the housing.

19. The apparatus of claim 18, wherein the shaping ring is slotted.

20. The apparatus of claim 12, wherein the explosively formable projectile piece has a concave shape.

21. The apparatus of claim 12, wherein the explosively formable projectile piece has more mass towards its center than along its perimeter.

22. An apparatus for use in an airbag inflation system, comprising:
   a housing at least partially defining a chamber, wherein the housing has a slotted opening;
   an initiator positioned within the chamber;
   a disk shaped explosively formable projectile piece positioned adjacent to the opening, wherein the diameter of the opening is, smaller than the diameter of the projectile piece such that, upon deployment of the initiator, the projectile piece is forced through the opening, thereby changing the shape of the projectile piece, and wherein each slot in the slotted opening causes the projectile piece to form a projection at the perimeter of the projectile piece while the projectile piece is forced through the opening; and
   a burst disk positioned opposite from the projectile piece such that the projectile piece is projected towards and ruptures the burst disk following deployment of the initiator.

23. A method for rupturing a burst disk in an airbag inflation system, comprising the steps at
   providing a housing at least partially defining a chamber, wherein the housing has an opening;
   providing a burst disk with a direct and unobstructed path to the opening; and
   using an explosive to force an explosively formable projectile piece through the opening, wherein the diameter of the opening is smaller than the diameter of the projectile piece such that, as the projectile piece is forced through the opening, the shape of the projectile piece is changed, and wherein, after the projectile piece is forced through the opening, the projectile piece contacts and ruptures the burst disk.

24. The method of claim 23, wherein the explosive is initiated with a squib.

25. The method of claim 23, wherein the opening is slotted.

26. The method of claim 23, wherein the opening is defined by a shaping ring connected to the housing.

27. The method of claim 26, wherein the shaping ring is slotted.

28. The method of claim 23, wherein the explosively formable projectile piece has more mass towards its center than along its perimeter.

29. The method of claim 23, wherein the explosively formable projectile piece is disk shaped.

30. The method of claim 29, wherein the explosively formable projectile piece has a concave shape.

31. The method of claim 23, wherein the burst disk is ruptured such that the area of the opening in the burst disk is significantly larger than the cross sectional area of the projectile piece after the projectile piece has passed through the opening.

32. An apparatus for use in an airbag inflation system, comprising:
   a housing at least partially defining a chamber, wherein the housing has an opening;
   an initiator positioned within the chamber;
   an explosively formable projectile piece positioned adjacent to the opening, wherein the diameter of the opening is smaller than the diameter of the projectile piece such that, upon deployment of the initiator, the projectile piece is forced through the opening, thereby changing the shape of the projectile piece; and
   a rupturable wall positioned opposite from the projectile piece such that the projectile piece ruptures the wall upon deployment of the initiator.

* * * * *